(12) United States Patent
Suzui

(10) Patent No.: US 7,755,850 B2
(45) Date of Patent: Jul. 13, 2010

(54) LENS APPARATUS AND LENS SYSTEM

(75) Inventor: Masaki Suzui, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 418 days.

(21) Appl. No.: 11/740,986

(22) Filed: Apr. 27, 2007

(65) Prior Publication Data

US 2007/0253078 A1    Nov. 1, 2007

(30) Foreign Application Priority Data

Apr. 28, 2006    (JP)    ............... 2006-125487

(51) Int. Cl.
   *G02B 15/14* (2006.01)
   *G02B 7/02* (2006.01)
   *G03B 13/18* (2006.01)
   *G03B 13/00* (2006.01)
   *G01C 21/02* (2006.01)

(52) U.S. Cl. .................. 359/697; 359/824; 396/89; 348/354; 250/203.3

(58) Field of Classification Search ......... 359/696–697, 359/812–814, 822–824, 806, 683, 676, 554; 396/85–87, 89, 133, 52, 55; 250/201.2, 203.3; 348/80, 354

See application file for complete search history.

(56) References Cited

U.S. PATENT DOCUMENTS

| 3,883,689 A | 5/1975 | Mansour et al. |
| 5,847,874 A | 12/1998 | Sasao et al. |
| 6,047,133 A * | 4/2000 | Washisu et al. ............... 396/55 |

FOREIGN PATENT DOCUMENTS

| JP | 2001-004903 A | 1/2001 |
| WO | 2005/024507 | 3/2005 |

* cited by examiner

*Primary Examiner*—Scott J Sugarman
*Assistant Examiner*—Dawayne A Pinkney
(74) *Attorney, Agent, or Firm*—Canon U.S.A., Inc. I.P. Division (57) ABSTRACT

A lens apparatus includes an optical lens unit including a movable lens portion, a drive unit configured to drive the movable lens portion, a control unit configured to control the drive unit, a difference calculation unit configured to calculate a difference between command signals received at intervals of a predetermined period, and an addition unit configured to add the difference calculated by the difference calculation unit to each of the command signals, wherein the control unit controls the drive unit based on a result of an addition performed by the addition unit.

10 Claims, 12 Drawing Sheets

LENS APPARATUS AND LENS SYSTEM

BACKGROUND OF THE INVENTION

1. Field of the Invention

The present invention relates to a lens apparatus and a lens system for use with, for example, a broadcasting camera.

2. Description of the Related Art

A large broadcasting lens apparatus is connected to a controller. A movable portion of an optical lens unit, such as a zoom lens, a focus lens, or an iris, is driven in response to a control command signal output from the controller.

The control command signal represents a control target value given to a control unit of the lens apparatus so as to control an object. An example of the lens apparatus is discussed in Japanese Patent Application Laid-Open No. 2001-4903.

However, the control unit of the lens apparatus discussed in Japanese Patent Application Laid-Open No. 2001-4903 simply controls driving of an object as synchronously as possible with an input control command signal.

This lens apparatus compensates for neither a delay due to each of delay elements of a drive system of the lens apparatus and to those of the controller nor a delay due to an operation of a camera operator. Consequently, this lens apparatus cannot compensate for deterioration in operability, which is caused due to output characteristics of the controller.

SUMMARY OF THE INVENTION

The present invention is directed to a lens apparatus and a lens system, which excel in operability.

According to an aspect of the present invention, a lens apparatus includes an optical lens unit including a movable lens portion, a drive unit configured to drive the movable lens portion, a control unit configured to control the drive unit, a difference calculation unit configured to calculate a difference between command signals received at intervals of a predetermined period, and an addition unit configured to add the difference calculated by the difference calculation unit to each of the command signals, wherein the control unit controls the drive unit based on a result of an addition performed by the addition unit.

A lens apparatus and a lens system according to exemplary embodiments of the present invention can compensate for reduction in operability, which is caused due to various delay elements and output characteristics of a controller, and can implement excellent operability.

Further features and aspects of the present invention will become apparent from the following detailed description of exemplary embodiments with reference to the accompanying drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
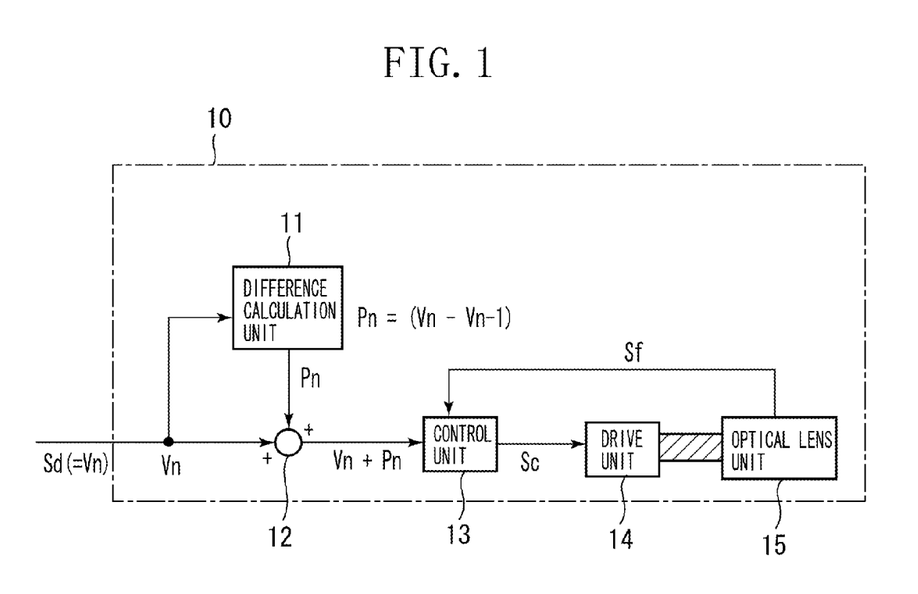
FIG. 1 is a functional block diagram illustrating a lens apparatus according to a first exemplary embodiment of the present invention.

FIG. 1 is a block diagram illustrating a lens apparatus 10. The lens apparatus 10 mainly includes a difference calculation unit 11, an addition unit 12, a control unit 13, a drive unit 14, and an optical lens unit 15. The difference calculation unit 11 receives a time-series command signal Sd (hereunder also designated by Vn as a signal in the lens apparatus 10), which is sent from a controller to the lens apparatus 10. The difference calculation unit 11 calculates a difference between a command signal Vn and another command signal Vn−1 that is received just previous to the command signal Vn. Then, the difference calculation unit 11 outputs a difference calculation result Pn=Vn−Vn−1 to the addition unit 12.

The addition unit 12 adds the difference calculation result Pn to the command signal Vn and supplies an addition result (Vn+Pn) to the control unit 13.

The control unit 13 outputs a drive signal Sc based on the addition result (Vn+Pn) to control an object via the drive unit 14. Accordingly, when the level of the command signal Vn drastically changes, the difference calculation result signal Pn increases. Consequently, the control unit 13 drastically responds to the command signal Vn, and generates a drastically changing drive signal Sc. The drive unit 14 is controlled according to the drastically changing drive signal Sc. Thus, the optical lens unit 15 (including a zoom lens, a focus lens, and an iris), which is mechanically connected to the drive unit 14, is drastically driven.

Generally, a movable portion of the optical lens unit 15 is provided with a position sensor (not shown) that detects the current position of the movable portion within a movable range. A feedback control operation is performed by feeding back a position signal Sf output from the position sensor to the control unit 13.

Although the position signal can be used for the feedback control operation, the signal used for controlling the movable portion is not limited thereto. It is useful to detect and use a necessary signal according to a control method therefor.

The command signal Sd can be stored in the lens apparatus 10 as internal data.

Figure 2:
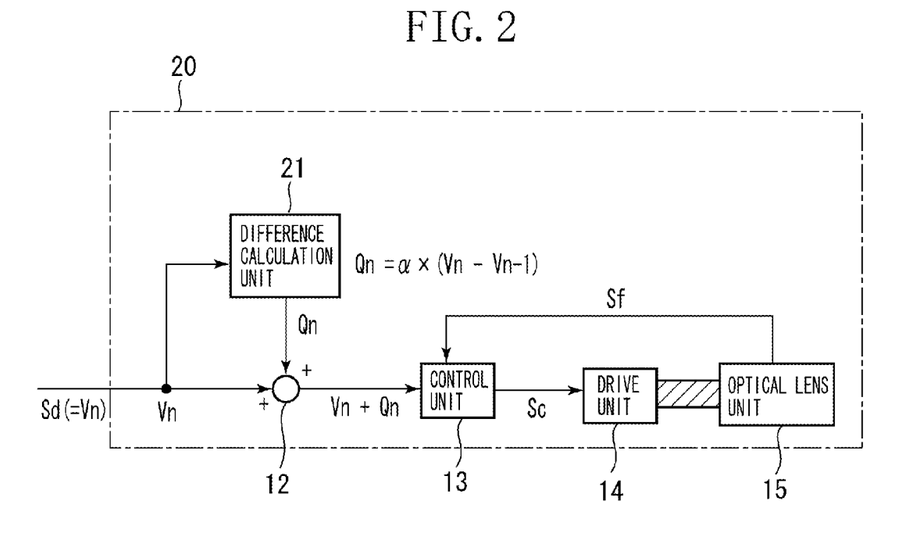
FIG. 2 is a functional block diagram illustrating a lens apparatus according to a modification of the first exemplary embodiment of the present invention.

FIG. 2 is a block diagram illustrating a lens apparatus 20 in which the difference calculation unit 11 in the lens apparatus 10 is replaced with another difference calculation unit 21. The optical lens unit 15 to be controlled is now assumed to be a zoom lens unit.

In this case, the command signal Sd sent form the controller is not a position command signal but a speed command signal.

Figure 3:
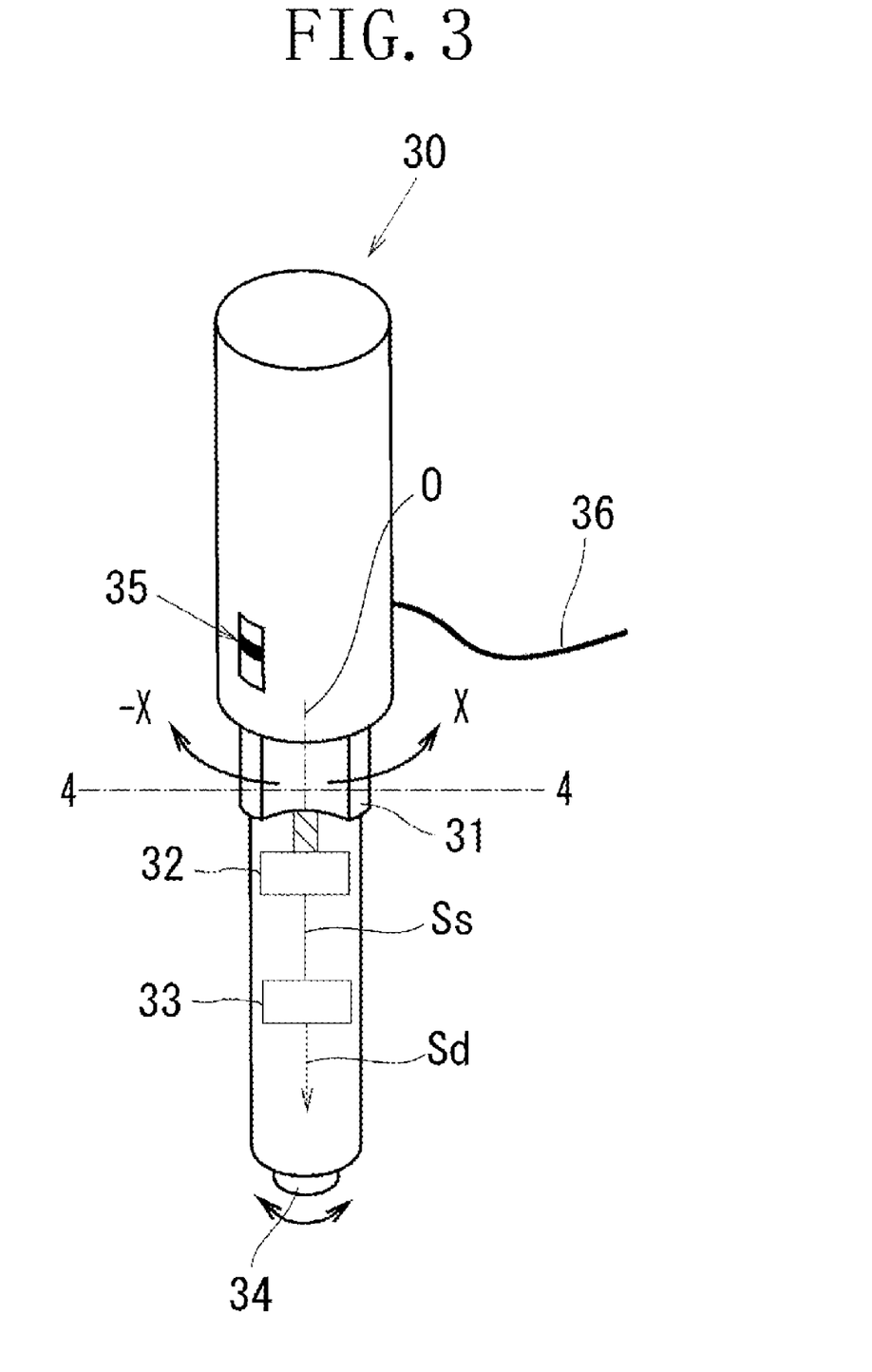
FIG. 3 is a perspective view illustrating a controller according to the first exemplary embodiment of the present invention.

The difference calculation unit 21 calculates a difference between a command signal Vn and another command signal Vn−1 output so that there is a predetermined time difference between the signals Vn and Vn−1. Further, the difference calculation unit 21 multiplies a difference calculation result Vn−Vn−1 by a coefficient α. Then, the difference calculation unit 21 outputs a multiplication result Qn=α×Vn−Vn−1 to the addition unit 12. A calculated value of the difference can be adjusted by the multiplication by the coefficient α to be within a desired range FIG. 3 is a perspective view illustrating a controller 30 serving as a rotary signal adjustment unit. The controller 30 of the type adapted to detect a rotation of a thumb ring 31 serving as an operating unit is generally referred to as a zoom demand. The controller 30 mainly includes the thumb ring 31, a potentiometer 32 configured to detect a rotation of the thumb ring 31, a speed command value calculation unit 33 configured to receive an output of the potentiometer 32, a spring constant adjustment unit 34 configured to adjust the level of a spring constant, a demand curve switch 35, and a demand cable 36 serving as a signal line.

A rotating shaft of the potentiometer 32 is mechanically connected to that of the thumb ring 31. When the thumb ring 31 is rotated, the potentiometer 32 supplies a rotation angle signal Ss to the speed command value calculation unit 33.

The speed command value calculation unit 33 determines a command signal Sd that is a determinate output of the controller 30. Also, the spring constant adjustment unit 34 adjusts a restoring force of a spring 31b (see FIG. 4) that is connected to the thumb ring 31.

The demand curve switch 35 is used to select one of a plurality of demand curves. The demand cable 36 is used to supply the command signal Sd to the lens apparatus 20.

Figure 4:
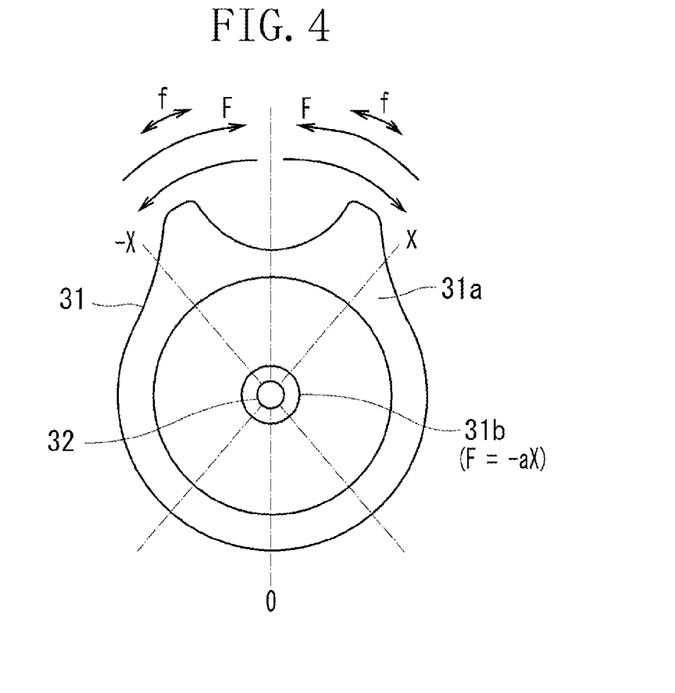
FIG. 4 is a cross-sectional view taken along line 4-4 shown in FIG. 3.

FIG. 4 is a cross-sectional view taken along line 4-4 shown in FIG. 3. The thumb ring 31 mainly includes an operating portion 31a and a spring 31b. The spring 31b is mechanically connected to a rotating shaft of the operating portion 31a. The operating portion 31a can rotate in an X-direction and a (−X)-direction shown in FIG. 4 in response to an external force. When the external force is removed, the restoring force of the spring 31b causes the operating portion 31a to return to a central position O.

A spring constant "a" of the spring 31b can be adjusted within a predetermined range by rotating the spring constant adjustment unit 34. The rotating shaft of the potentiometer 32 is connected to that of the operating portion 31a. When an operation for rotating the operating portion 31a is performed, the potentiometer 32 rotates and outputs a rotation angle signal Ss.

Figure 5:
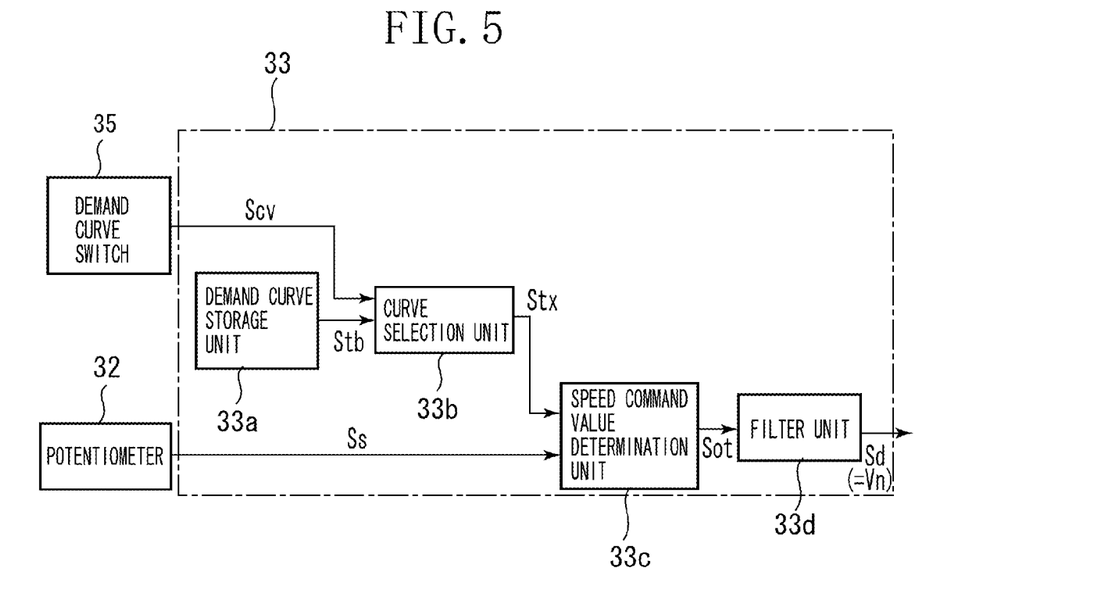
FIG. 5 is a functional block diagram illustrating a speed command value calculation unit mounted in the controller according to the first exemplary embodiment of the present invention.

FIG. 5 is a functional block diagram illustrating the speed command value calculation unit 33 of the controller 30.

The speed command value calculation unit 33 mainly includes a demand curve storage unit 33a, a curve selection unit 33b, a speed command value determination unit 33c, and a filter unit 33d.

The demand curve storage unit 33a has a table used to determine an output characteristic of the controller 30. More specifically, the demand curve storage unit 33a stores a plurality of table signals Stb corresponding to the rotation angle signal Ss. The demand curve storage unit 33a outputs the table signals Stb to the curve selection unit 33b.

The table signals Stb and a curve selection signal Scv output from the demand curve switch 35 are input to the curve selection unit 33b. Then, one of the table signals Stb selected based on the curve selection signal Scv is supplied to the speed command value determination unit 33c as a demand curve signal Stx.

The rotation angle signal Ss output from the potentiometer 32 and the demand curve signal Stx are input to the speed command value determination unit 33c. The speed command value determination unit 33c calculates data corresponding to the rotation angle signal Ss from a table represented by the demand curve signal Stx. Then, the speed command value determination unit 33c outputs the calculated data as an output signal Sot. The filter unit 33d is a low-pass filter. The output signal Sot is input to the filter unit 33d. The filter unit 33d outputs a command signal Sd.

Usually, an output of the speed command value calculation unit 33 is set so that when the thumb ring 31 is in the central position O, the command signal Sd represents "0" (i.e., the command signal Sd indicates that a zooming operation is stopped). As the rotation angle X increases, the output of the speed command value calculation unit 33 increases. Thus, a zooming speed is increased.

With this configuration, the controller 30 outputs the command signal Sd corresponding to the rotation angle X of the thumb ring 31. When an operating force is removed, the command signal Sd corresponds to a zooming speed of "0".

Figure 6:
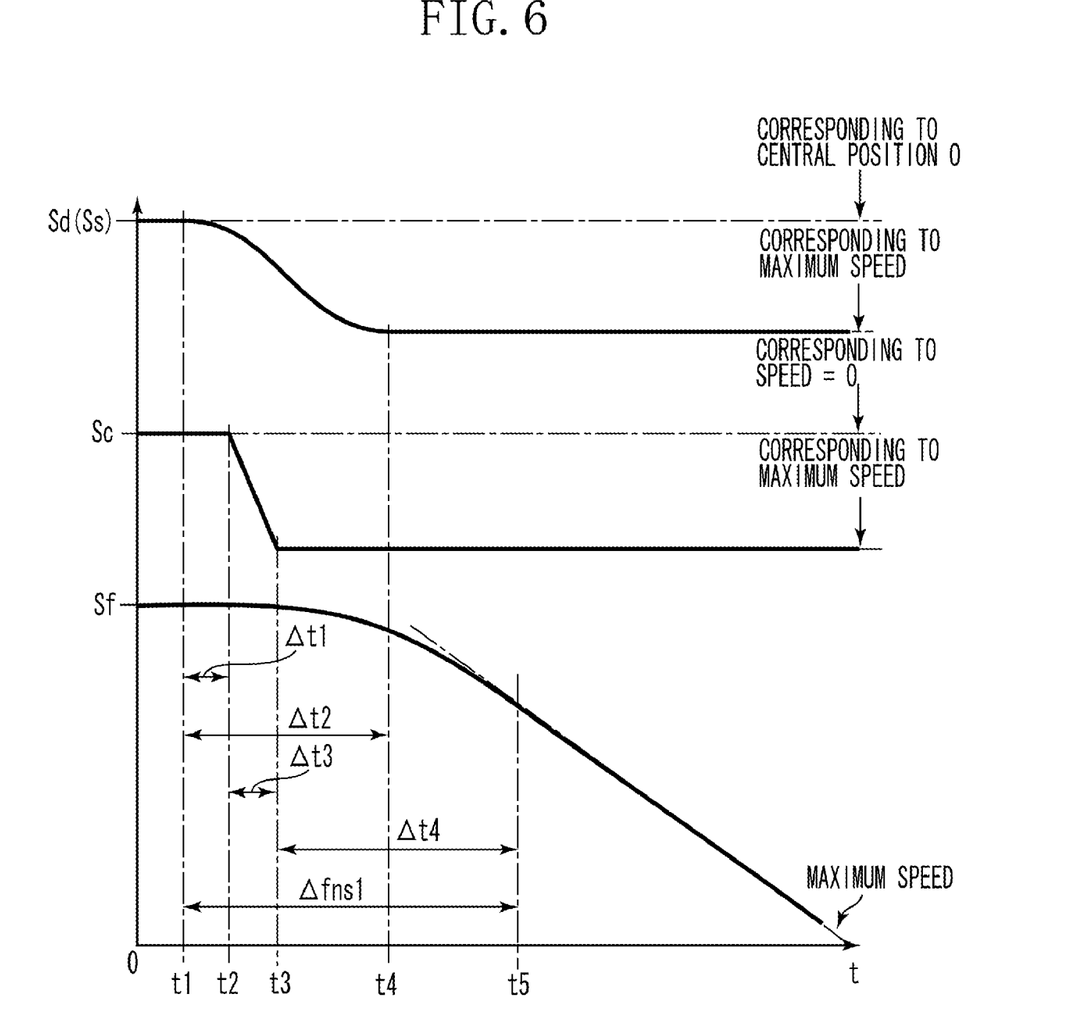
FIG. 6 is a graph illustrating a state transition of various signals in the lens apparatus and the controller according to the first exemplary embodiment of the present invention.

FIG. 6 is a graph illustrating a state transition of various signals in the lens apparatus 20 and the controller 30.

When an operation for rotating the thumb ring 31 of the controller 30 from the central position O to a position corresponding to a rotation angle which corresponds to a maximum speed is started at moment t1, the state of the command signal Sd (or the rotation angle signal Ss) changes as the thumb ring 31 is rotated.

The control signal Sc output from the control unit 13 drastically changes in a time period between moment t2, which is a delay time Δt1 after moment t1, and moment t3, which is a time Δt3 after moment t2.

This is because an amount Qn=α×(Vn−Vn−1) of change in the command signal Vn is added to the command signal Vn.

Also, at moment t2 or later on, a position signal Sf of the sensor attached to the optical lens unit 15 changes.

After the command signal Sd (or the rotation angle signal Ss) reaches a value corresponding to a desired maximum speed at moment t4, a speed corresponding to an amount of change of the position signal Sf reaches a maximum speed at moment t5.

A time Δfns1 is a total time since the thumb ring 31 is operated, which is required for the zoom lens to reach a desired maximum speed. The delay time Δt1 occurs mainly due to a time required for the control unit 13 to process signals and due to a time required for various communications. A delay time Δt4 from moment t3, at which the control signal Sc reaches a value corresponding to a maximum speed, to moment t5, at which a rate of change of the position signal Sf, that is, a speed corresponding thereto, reaches a maximum speed, occurs mainly due to delay elements that include drive capability of a control system and an object to be controlled.

To more clearly describe the present embodiment, a functional block diagram illustrating a conventional lens apparatus and a graph illustrating a state transition of various signals in the conventional lens apparatus are described for comparison with the present embodiment.

Figure 7:
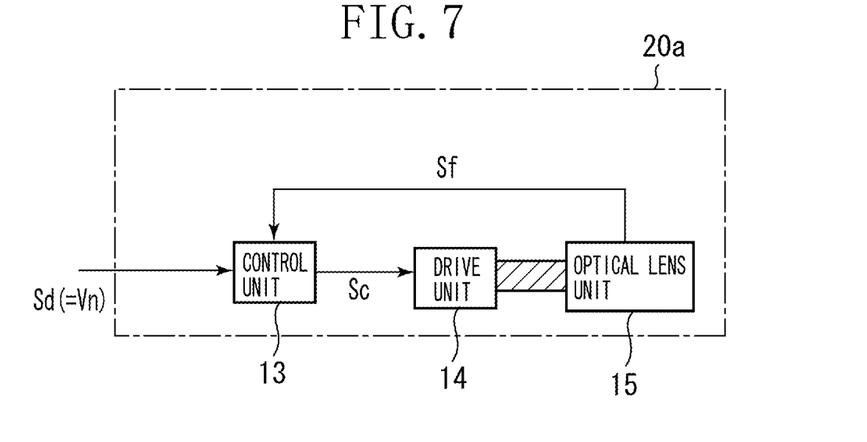
FIG. 7 is a functional block diagram illustrating a conventional lens apparatus according to a comparative example.

FIG. 7 is a functional block diagram illustrating a conventional lens apparatus 20a.

The conventional lens apparatus 20a differs from the lens apparatus 20 of the present embodiment illustrated in FIG. 2 in that the conventional lens apparatus 20a does not include the difference calculation unit 21 and the addition unit 12.

Figure 8:
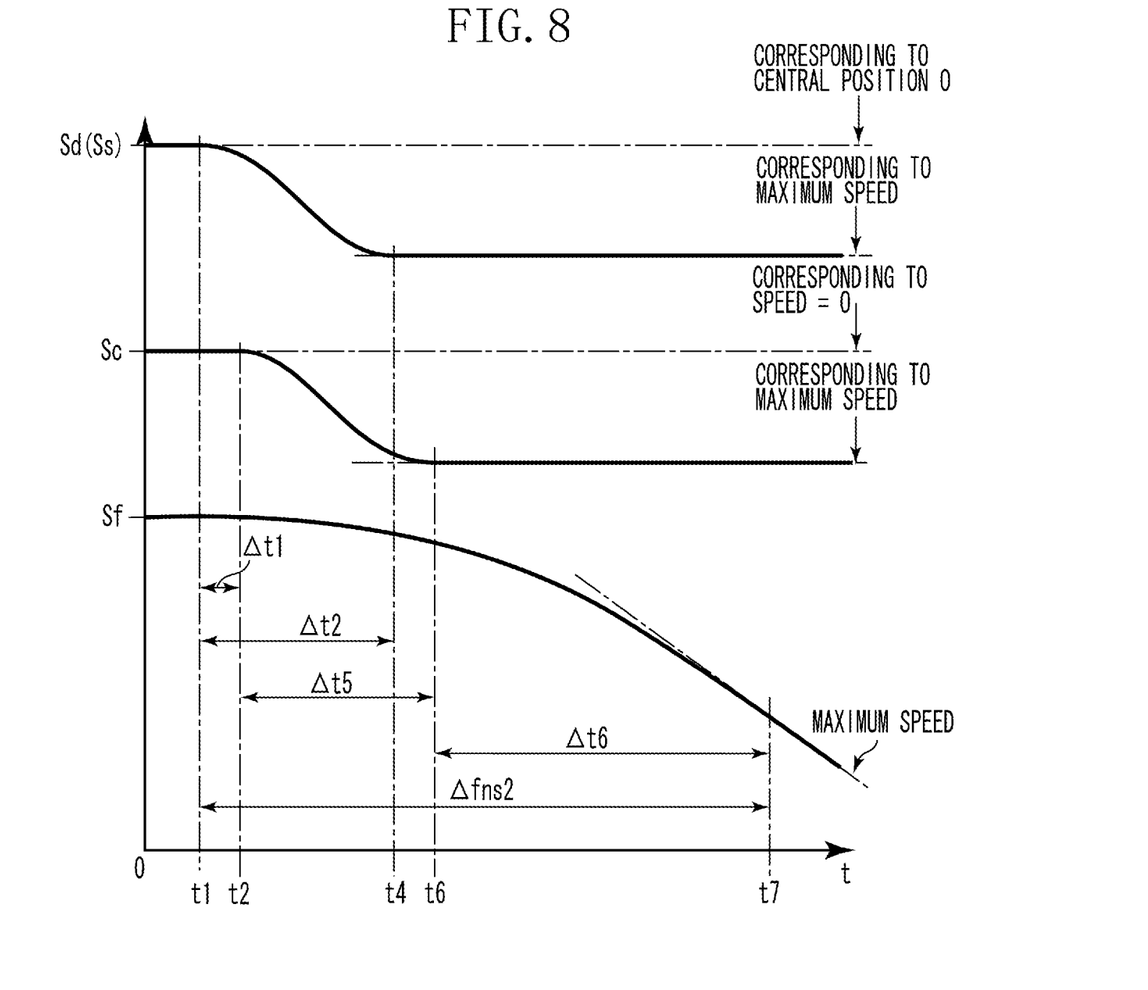
FIG. 8 is a graph illustrating a state transition of various signals in the lens apparatus and the controller according to the comparative example.

FIG. 8 is a graph illustrating a state transition of various signals in the conventional lens apparatus 20a and the controller 30.

Similar to the description with reference to FIG. 6, an operation of the conventional lens apparatus 20a in the case of operating the thumb ring 31 is described below.

When an operation for rotating the thumb ring 31 is started at moment t1, after an operation time Δt5 (approximately equal to a time Δt2) from moment t2, which is a delay time Δt1 after moment t1, to moment t6 has elapsed, a control signal Sc output from the control unit 13 of the conventional lens apparatus 20a changes to follow a command signal Sd.

Additionally, at moment t2 or later on, a position signal Sf representing the position of a zoom lens gently changes. After a control signal Sc reaches a value corresponding to a desired maximum speed at moment t6, an amount of change of the position signal Sf, that is, a speed corresponding thereto, reaches a maximum speed at moment t7, which is a delay time Δt6 after moment t6.

Thus, as compared with the conventional lens apparatus 20a, the lens apparatus 20 according to the present exemplary embodiment can faster reach the desired maximum speed. Accordingly, the total necessary time Δfns1 in the case of the lens apparatus 20 according to the present exemplary embodiment is shorter than the necessary time Δfns2 in the case of the conventional lens apparatus 20a.

Consequently, even in a case where the delay times Δt1 and Δt4 due to the delay elements of the control system and the object to be controlled occur, the lens apparatus 20 according to the present exemplary embodiment can faster reach the desired maximum speed, as compared with the conventional lens apparatus 20a.

Also, another problem can be solved according to the present exemplary embodiment.

That is, even in a case where the thumb ring 31 is rapidly operated, there is a limit to a speed of operating the thumb ring 31 due to the limit to a speed at which an operator operates the thumb ring 31, and due to influence of a rotational friction force of the thumb ring 31 and to a damper element.

Therefore, as illustrated in FIG. 6, a nonnegligible operation time Δt1 is needed, as compared with the total necessary time Δfns1. Also, as illustrated in FIG. 4, generally, the operating portion 31a of the thumb ring 31 has a mechanism for automatically returning to the central position O by a restoring force of a spring. Consequently, in a case where the operating portion 31a is rotated against the restoring force of the spring, the restoring force is a factor of disturbing the rapid operation of the thumb ring 31.

In a case where the operating portion 31a is returned to the central position O, when an operator applies a force f in a returning direction, as illustrated in FIG. 4, a resultant force (F+f) of the force f and the restoring force F causes the thumb ring 31 to rotate at high speed toward the central position O. Thus, it is difficult for the operator to stop the thumb ring 31 at a desired position. Therefore, generally, the operator returns the operating portion 31a to the central position O by relying on the restoring force F of the spring 31b. Consequently, a time constant determined by the restoring force F of the spring 31b, the rotational friction force, and the damper element predominates a time ΔtR required for the thumb ring 31 to return to the central position O.

For such reasons, an operating speed intended by the operator cannot be obtained even when the operator intends to quickly return the thumb ring 31 to the central position O. This defect becomes serious, especially, when the thumb ring 31 is returned from a position corresponding to a maximum rotation angle to the vicinity of the central position O.

Thus, in the case of using the controller of the above configuration generally and widely used, there is a limit to improvement of an operator's operability of the conventional lens apparatus shown in FIG. 7, even if followability of the control unit, the drive unit, and the movable portion to the command signal Sd is increased.

On the other hand, the lens apparatus 20 according to the present exemplary embodiment adds an amount of change of the command signal Sd to the command signal Sd. Accordingly, even when the thumb ring 31 cannot quickly be operated as intended by an operator, an object to be controlled can be rapidly moved as intended by the operator. Additionally, when the thumb ring 31 is gradually operated, the speed can be controlled along a demand curve.

Second Exemplary Embodiment

Figure 9:
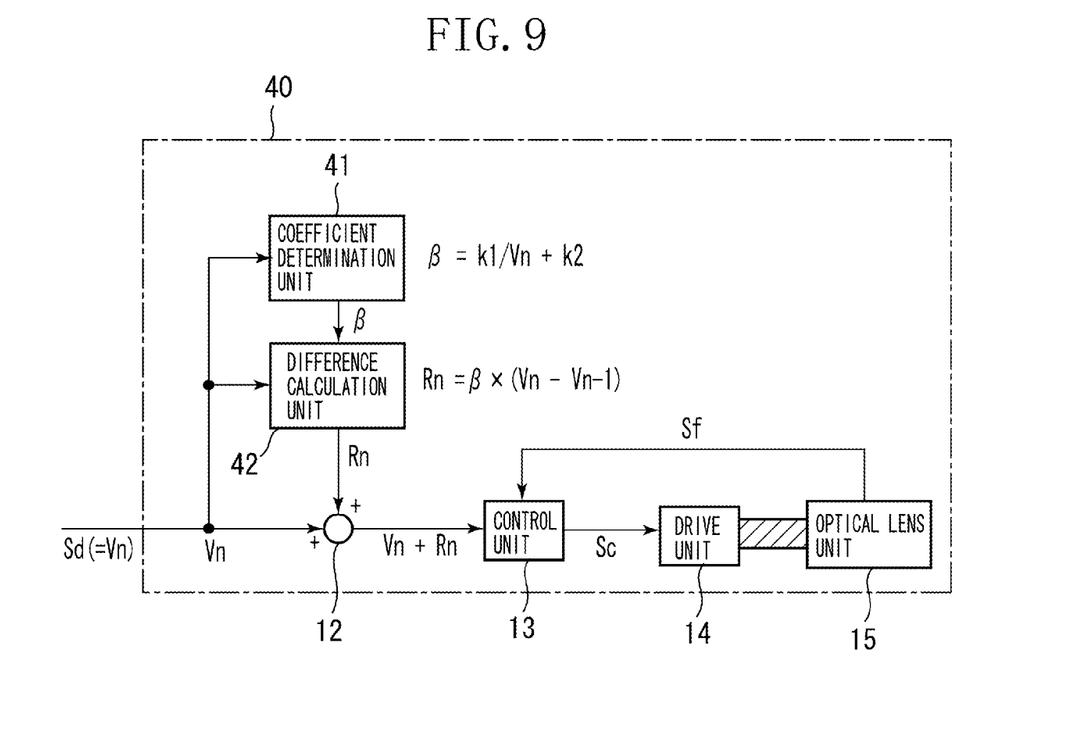
FIG. 9 is a functional block diagram illustrating a lens apparatus according to a second exemplary embodiment of the present invention.

FIG. 9 is a functional block diagram illustrating a lens apparatus 40 according to a second exemplary embodiment.

The lens apparatus 40 differs from the lens apparatus 20 of the first exemplary embodiment in that a coefficient determination unit 41 is added and the difference calculation unit 21 is replaced with a difference calculation unit 42 in the lens apparatus 40.

The coefficient determination unit 41 determines a coefficient β, which is a function of a command signal Vn. The command signal Vn is input to the coefficient determination unit 41. Then, the coefficient determination unit 41 supplies the coefficient β to the difference calculation unit 42. Similar to the difference calculation unit 21, the difference calculation unit 42 calculates a difference (Vn−Vn−1) between the command signals adjoining each other in time sequence.

Further, the difference calculation unit 42 multiplies the difference (Vn−Vn−1) by the coefficient β and supplies a result Rn=β×(Vn−Vn−1) of the multiplication to the addition unit 12.

Figure 10:
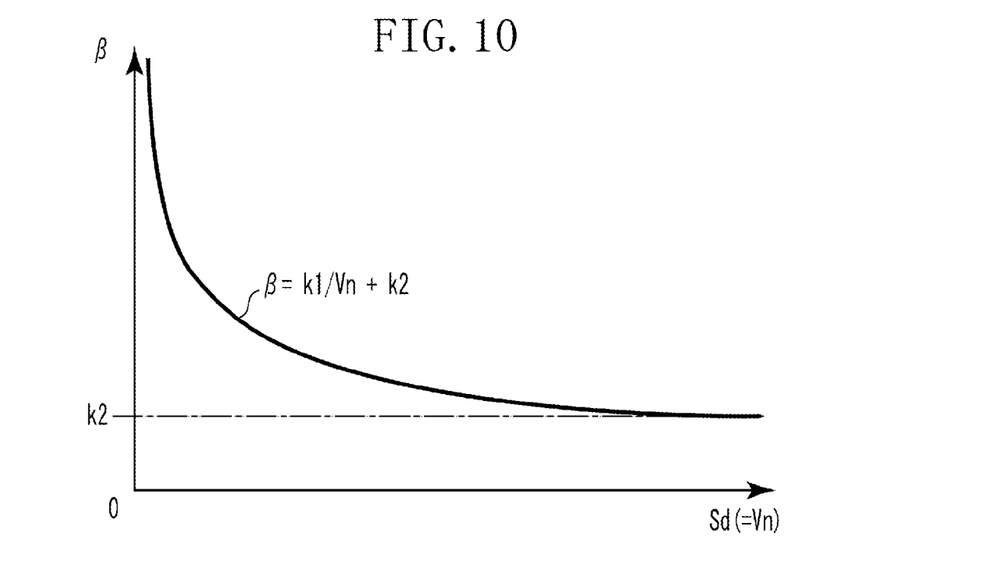
FIG. 10 is a graph illustrating a characteristic of a coefficient used in the lens apparatus according to the second exemplary embodiment of the present invention.

FIG. 10 is a graph illustrating a relationship between the coefficient β determined by the coefficient determination unit 41 and the command signal Sd.

The coefficient β has a value obtained by adding a parameter k2 to a result of multiplying the inverse of the command signal Vn by a parameter k1. Accordingly, the coefficient β has the following characteristic. As the value of the command signal Vn is smaller, the value of the coefficient β is larger. Conversely, as the value of the command signal Vn is larger, the value of the coefficient β converges to the parameter k2.

Thus, even when the value of the command signal Vn is small, the value of the difference calculation signal Rn becomes larger via the multiplication of the coefficient β. Accordingly, even when the value of the command signal Vn is small, a rate of change of the sum (Vn+Rn) of the command signal Vn and the difference calculation signal Rn can be uniformed. In particular, in a case where a broadcasting controller is connected to the lens apparatus 40, this effect is useful.

Generally, an electrically-driven zoom lens portion of the broadcasting television camera has a very wide speed range due to the need of a large adjustment of angle of view or due to the necessity of special camera effects.

For example, it is not uncommon that a time required to perform zooming from a W-end (wide-angle end) to a T-end (telephoto end) covers a very wide range from a very low speed region, in which the required time is equal to or longer than several hundred seconds, to an ultrahigh speed region, in which the required time is equal to or shorter than one second. To implement such a very wide speed range, it is necessary that a controller connected to the lens apparatus 40 also covers a broad speed range.

Figure 11:
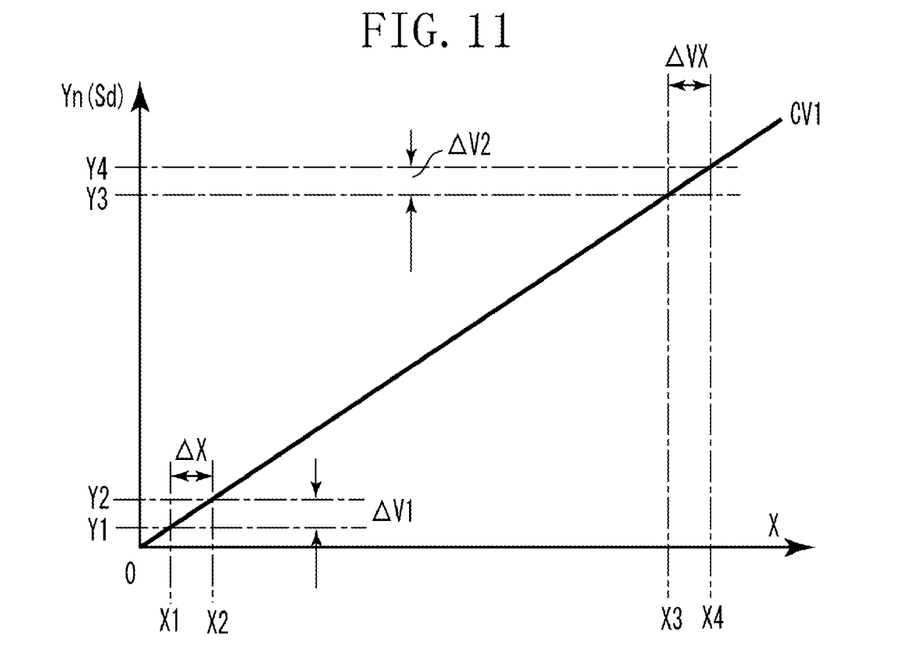
FIG. 11 is a graph illustrating a command signal with respect to an operative position of a thumb ring.

FIG. 11 is a graph illustrating the command signal Sd with respect to the operative position X of the thumb ring 31. In this graph, the value of a speed at which the zoom lens portion actually operates at the operative position X is designated by Yn. In a case where the value of the command signal Sd is proportional to the operative position X, when the thumb ring 31 is operated in the same amount ΔX, the zooming speed changes in the same amount ΔV.

However, in a case where the thumb ring 31 is operated in the same amount ΔX in, for example, a low speed region in which the operative position ranges from X1 to X2 and a high speed region in which the operative position ranges from X3 to X4, a rate of change (Y2/Y1) in the speed in the low speed region largely differs from a rate of change (Y4/Y3) of the speed in the high speed region. For example, in a case where the times required to perform zooming from a W-end to a T-end, which correspond to the speeds Y1, Y2, Y3, and Y4, are 1001 seconds, 1000 seconds, two seconds, and one second, respectively, the rate of change (Y2/Y1) is approximately 0.1 (%), and the rate of change (Y4/Y3) is 50%.

Therefore, even when the thumb ring 31 is operated at different operative positions to obtain the same amount of operation of the thumb ring 31, the rates of change of the speed, which are respectively obtained at the operative positions, may largely differ from one another. Thus, an operator may feel that the change in the zooming speed largely varies with the operative positions. Consequently, the operator may feel that the operability of the zoom lens portion is poor.

Figure 12:
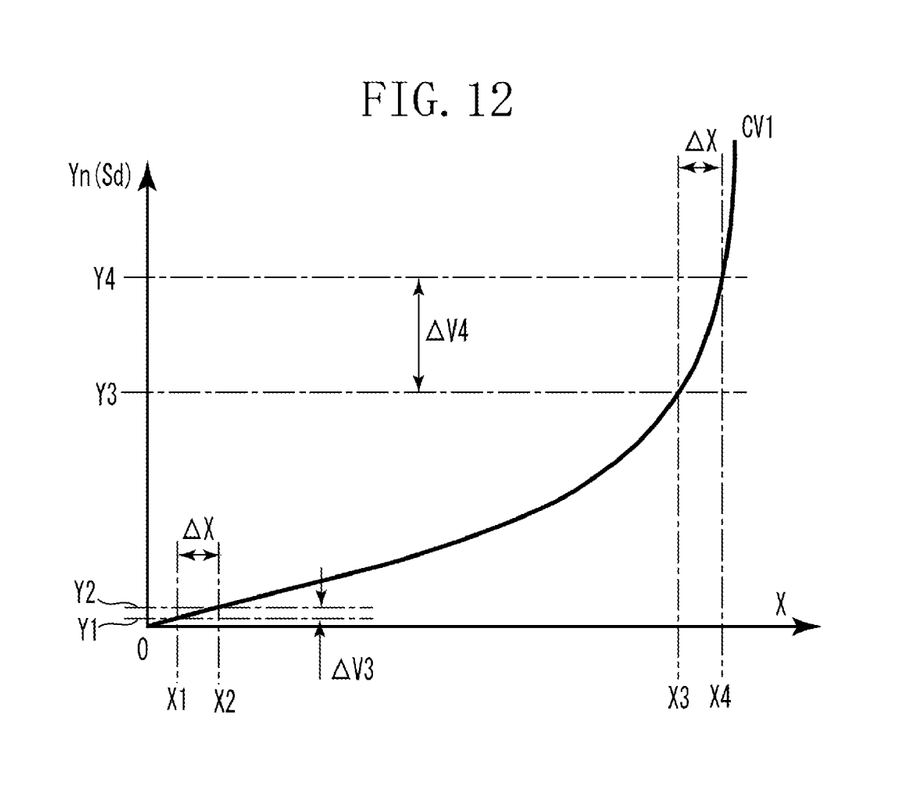
FIG. 12 is a graph illustrating a command signal with respect to an operative position of the thumb ring.

Also, the gradient (=(Y/X)) of a broadcasting zoom demand curve in a low speed region is usually set to be small, as illustrated in FIG. 12, to facilitate implementation of a low speed.

In this case, the rate of change in the speed in a low speed region is decreased still more, as compared with the case where the demand curve is linear, as illustrated in FIG. 11.

On the other hand, in the case of the lens apparatus 40 according to the second exemplary embodiment, the lower the zooming speed becomes, the coefficient β becomes larger.

Accordingly, in a case where the thumb ring 31 is operated at operative positions to obtain the same amount of operation thereof, the rate of change of the speed can be made to be approximately the same, regardless of the operative positions.

Therefore, the lens apparatus 40 can provide useful operability regardless of the operative positions of the thumb ring 31.

Generally, it is useful that when the thumb ring 31 is gradually operated, the zoom lens portion operates at a speed equal to a speed obtained from the demand curve at the operative position. Thus, in the case of this slow operation of the thumb ring 31, that is, in a case where the difference (Vn−Vn−1) between the command signals is small, it is useful that the coefficient β is set to 0 or to a value close to 0. To stabilize a zooming operation in an ultralow speed region, even in a case where the value of the command signal Vn is extremely small, for example, where the command signal Sd represents a moving speed at which the time required to perform zooming from the W-end to the T-end is equal to or less than 100 seconds, it is useful that the coefficient β is set to 0 or to a value close to 0.

Additionally, in a case where the thumb ring 31 is returned to the central position O, the restoring force of the spring 31b may cause the thumb ring 31 to pass over the central position O. At that time, the controller 30 outputs an inversion signal differing in polarity from signals having been output until that time.

In such a case, if a result Rn (=β×(Vn−Vn−1)) of the multiplication is directly added to the command signal Vn similar to the second exemplary embodiment, an overshoot may occur just before the zoom lens portion stops. Accordingly, it is useful to set the coefficient β to 0 even in a case where the values of the command signals Vn and Vn−1 differ in sign from each other. Additionally, in a case where the result Rn is larger than the value of the command signal Sd to which the result Rn is added, unfavorable operations including an overshoot may occur. In this case, it is useful that an appropriate upper limit value is set corresponding to the result Rn or the coefficient β.

A method for setting the coefficient β is not limited to the use of the expression illustrated in FIG. 10. For example, it is useful to preliminarily provide a table containing data that represents the relation between the coefficient β and the difference (Vn−Vn−1). Additionally, the command signals used to calculate the difference do not necessarily adjoin each other in time sequence. It is also useful to calculate the difference between the averages of the values of the command signals Sd over a predetermined time. Alternatively, the command signals Sd sampled at predetermine intervals can be used to calculate the difference.

In short, it is useful to configure the lens apparatus so that a change in the values of the command signals Sd on a time sequence basis is detected, the detected change is added to the value of the command signal Sd, and the control unit 13 controls an object based on a result of the addition.

Third Exemplary Embodiment

Figure 13:
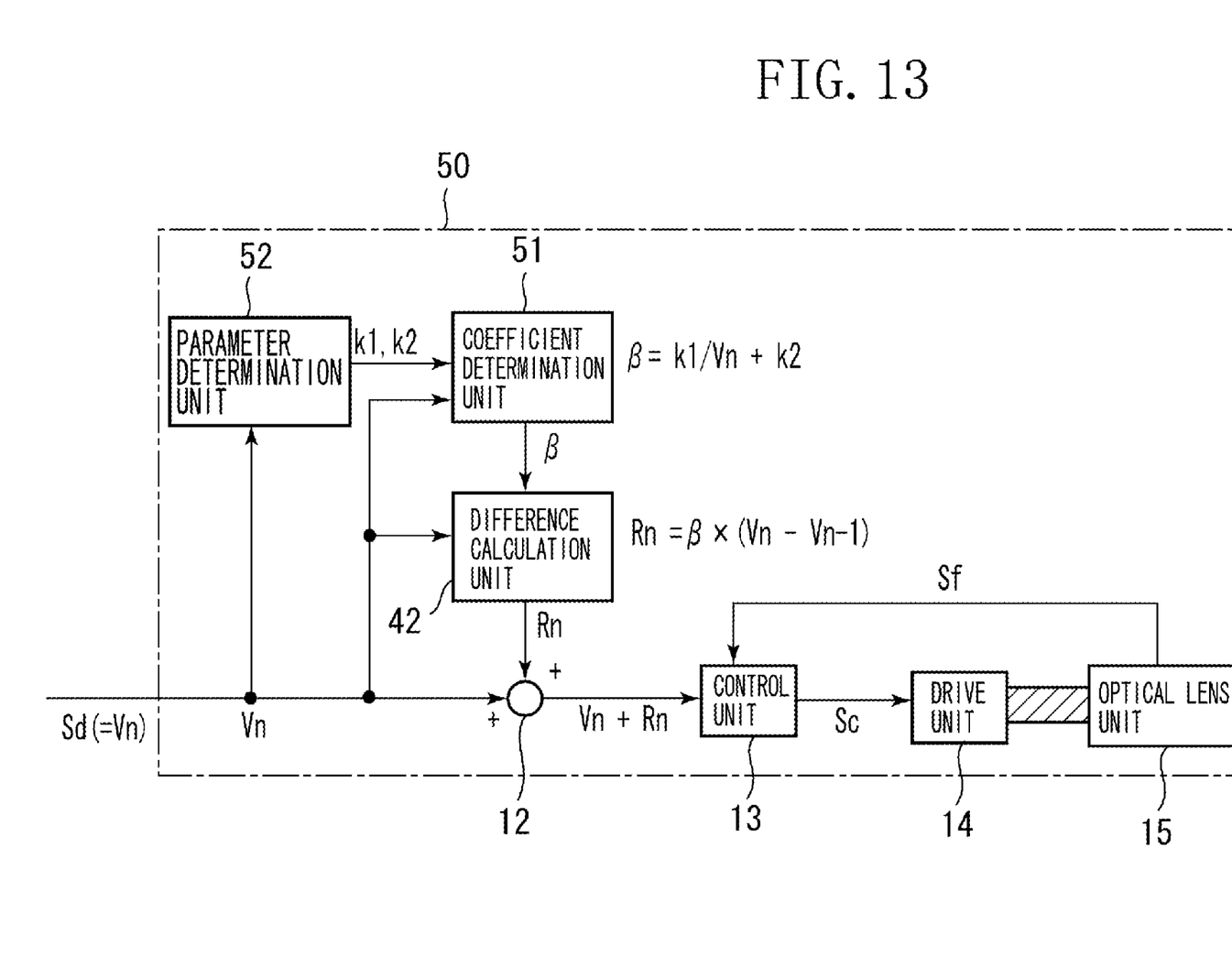
FIG. 13 is a functional block diagram illustrating a lens apparatus according to a third exemplary embodiment of the present invention.

FIG. 13 is a functional block diagram illustrating a lens apparatus 50 according to a third exemplary embodiment. The lens apparatus 50 differs from the lens apparatus 40 illustrated in FIG. 9 in that the coefficient determination unit 41 is replaced with a coefficient determination unit 51 in the lens apparatus 50, and a parameter determination unit 52 is added.

The coefficient determination unit 51 differs from the coefficient determination unit 41 according to the second exemplary embodiment in that parameters k1 and k2 are input from the parameter determination unit 52. The parameter determination unit 52 is used to determine the parameters k1 and k2.

More specifically, the command signal Vn is input to the parameter determination unit 52. In a case where the difference ($|Vn|-|Vn-1|$) between absolute values $|Vn|$ and $|Vn-1|$ of the command signals Vn and Vn−1 adjoining each other in time sequence is greater than 0, or where the difference ($|Vn|-|Vn-1|$) is less than 0, the values of the parameters k1 and k2 are changed.

According to the third exemplary embodiment of the present invention, in a case where the difference ($|Vn|-|Vn-1|$) is equal to 0, it is determined that the thumb ring 31 is not drastically operated. Then, the parameters are set so that k1=k2=0 (corresponding to the coefficient β=0).

In a case where the values of the command signals Vn and Vn−1 differ in sign from each other, it is determined that the thumb ring 31 has passed over the central position O. Thus, similarly, the parameters are set so that k1=k2=0 (corresponding to the coefficient β=0). Therefore, according to the third exemplary embodiment, the values of the command signals Vn and Vn−1 practically have the same sign.

In cases where the difference ($|Vn|-|Vn-1|$) is greater than 0, or where the difference ($|Vn|-|Vn-1|$) is less than 0, that is, in cases where the thumb ring 31 is operated during acceleration, or where the thumb ring 31 is operated during deceleration, the coefficient β is changed in the lens apparatus 50 having the parameter determination unit 52 according to the third exemplary embodiment of the present invention.

Accordingly, operability can be obtained so that the operability in the case of acceleration differs from the operability in the case of deceleration, for example, so that acceleration is sharply performed, while deceleration is slowly performed.

Figure 14:
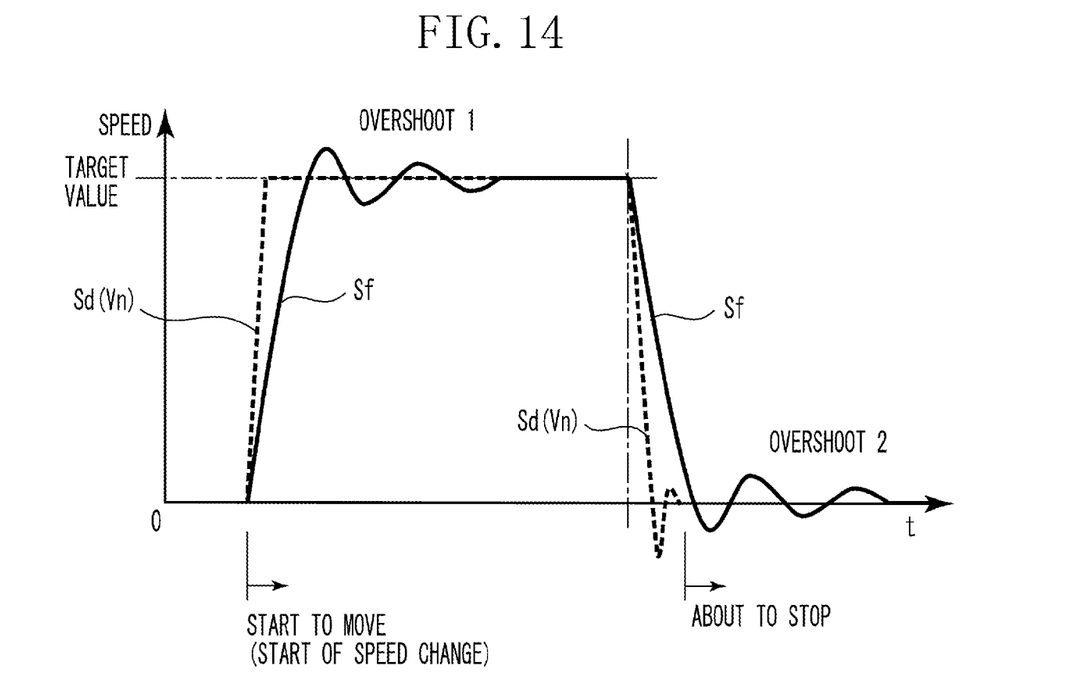
FIG. 14 is a graph illustrating a state transition of the lens apparatus according to the third exemplary embodiment of the present invention.

FIG. 14 is a graph illustrating a state transition of the lens apparatus 50 according to the third exemplary embodiment. In the lens apparatus 50, when the movable portion reaches a target speed or stops, the movable portion causes a large overshoot 1 or 2 depending upon the set values of the parameters k1 and k2.

In particular, the overshoot 2, which is caused when the movable portion is stopped, is problematic. Thus, as above described, during deceleration, the parameters k1 and k2 are set to be smaller that those set during acceleration. Consequently, while maintaining the rapid establishment of an accelerated state, the overshoot caused at the stopping of the movable portion can be reduced.

A case where the command signal Sd is used as a position command signal is described below.

Figure 15:
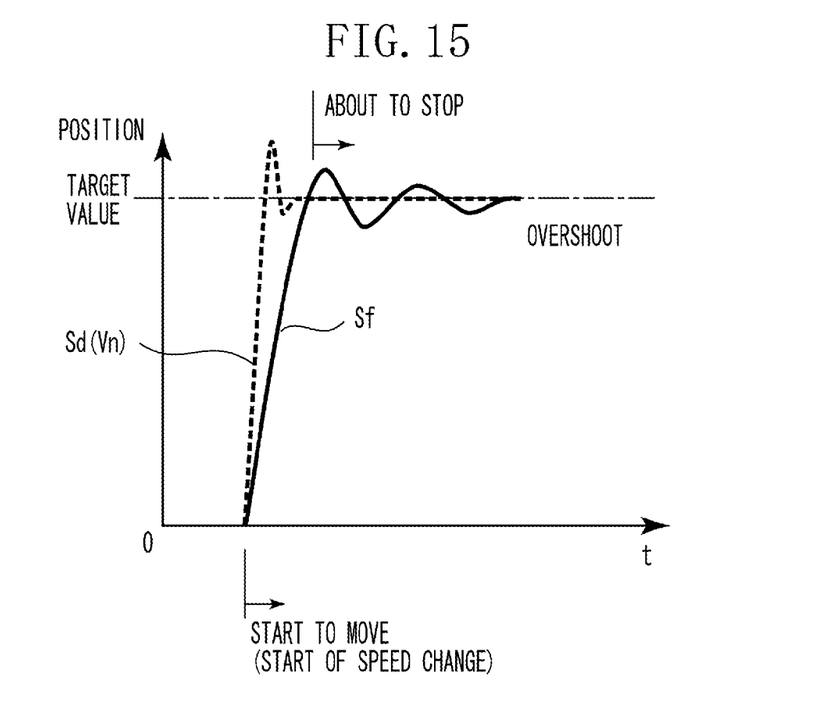
FIG. 15 is a graph illustrating a state transition of the lens apparatus according to the third exemplary embodiment of the present invention.

FIG. 15 is a graph illustrating a state transition of the lens apparatus 50 in a case where the command signal Sd is assumed to be a position command signal. As illustrated in FIG. 15, in a case where the command signal Sd is the position signal Sf, the command signal Sd itself relates to neither acceleration nor deceleration.

Accordingly, in this case, there is no necessity for changing the coefficient β according to the result of computing the difference ($|Vn|-|Vn-1|$). On the other hand, it is useful to select the parameters k1 and k2 according to which no overshoot occurs at all times.

Fourth Exemplary Embodiment

Figure 16:
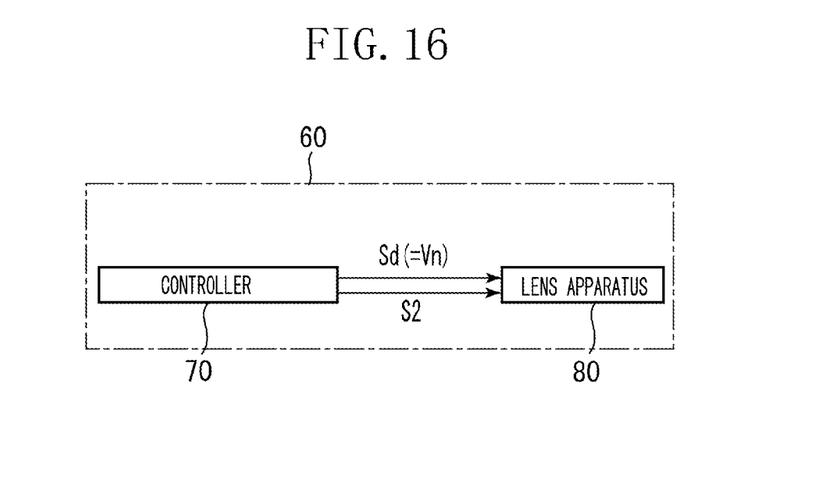
FIG. 16 is a functional block diagram illustrating a lens apparatus according to a fourth exemplary embodiment of the present invention.

FIG. 16 is a functional block diagram illustrating a lens system 60 according to a fourth exemplary embodiment of the present invention.

The lens system 60 includes a controller 70 and a lens apparatus 80.

Figure 17:
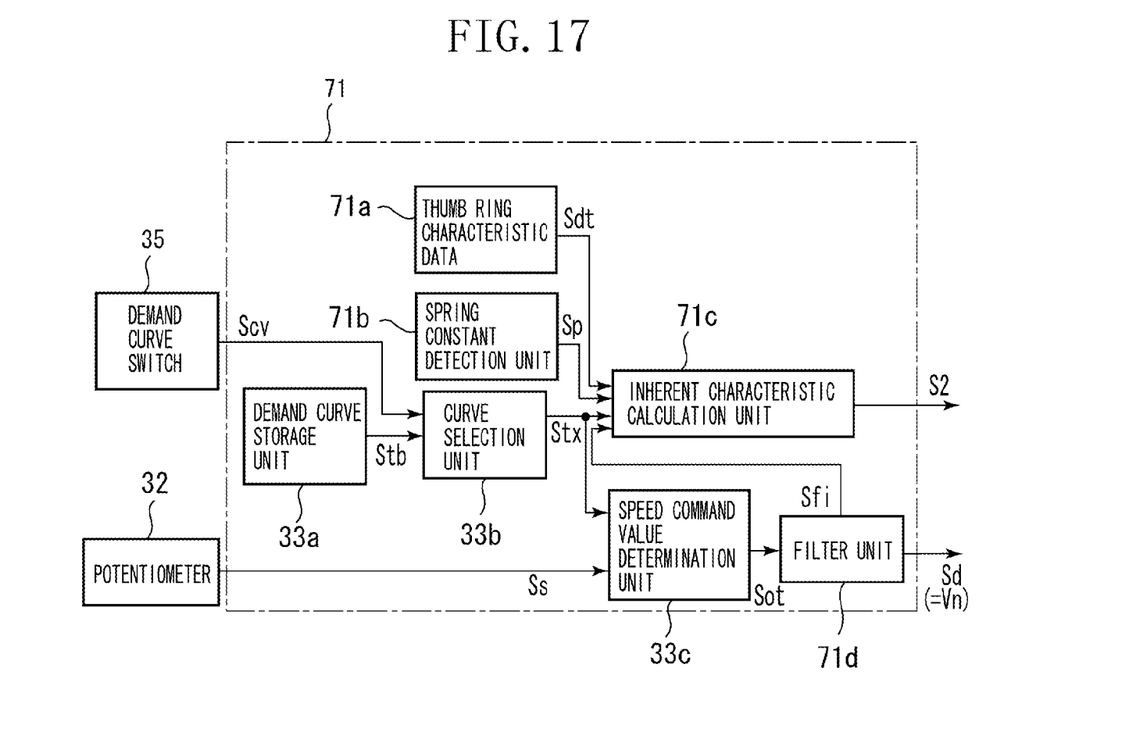
FIG. 17 is a functional block diagram illustrating a speed command value calculation unit mounted in a controller according to the fourth exemplary embodiment of the present invention.

FIG. 17 is a functional block diagram illustrating a speed command value calculation unit 71 mounted in the controller 70.

The controller 70 differs from the controller 30 employed in the first to third exemplary embodiments in that the speed command value calculation unit 71 is employed instead of the speed command value calculation unit 33.

The speed command value calculation unit 71 differs from the speed command value calculation unit 33 shown in FIG. 5 in that a thumb ring characteristic data storage unit 71*a*, a spring constant detection unit 71*b*, and an inherent characteristic calculation unit 71*c* are added.

Additionally, a filter unit 71*d* is employed instead of the filter unit 33*d*.

The thumb ring characteristic data storage unit 71*a* stores various data concerning mechanical operating characteristics of the thumb ring 31.

The thumb ring characteristic data storage unit 71*a* outputs data Sdt concerning dynamic/static friction coefficients, damping elements, a time constant at the time of returning to the central position O of the thumb ring 31.

The spring constant detection unit 71*b* detects a rotation angle of the spring constant adjustment unit 34 shown in FIG. 3. The spring constant detection unit 71*b* includes a potentiometer 32 connected to the rotating shaft of the spring constant adjustment unit 34. A spring adjustment angle signal Sp is output from the potentiometer 32 to the inherent characteristic calculation unit 71*c*.

The filter unit 71*d* includes a low-pass filter similar to the filter unit 33*d*. An output Sot of the speed command value determination unit 33*c* is input to the filter unit 71*d*. The filter unit 71*d* outputs a command signal Sd to the lens apparatus 80. Also, the filter unit 71*d* outputs a signal representing a cutoff frequency Sfi to the inherent characteristic calculation unit 71*c*.

The inherent characteristic calculation unit 71*c* calculates an outline of the command signal Sd which is output when the thumb ring 31 is operated, based on the input thumb ring characteristic data Sdt, the spring adjustment angle signal Sp, the selected demand curve signal Stx, and the cutoff frequency signal Sfi.

Then, as described in the third exemplary embodiment with reference to FIG. 4, the inherent characteristic calculation unit 71*c* outputs an inherent characteristic signal S2 representing the parameters k1 and k2 set so that no overshoot occurs when the zoom lens portion stops.

Figure 18:
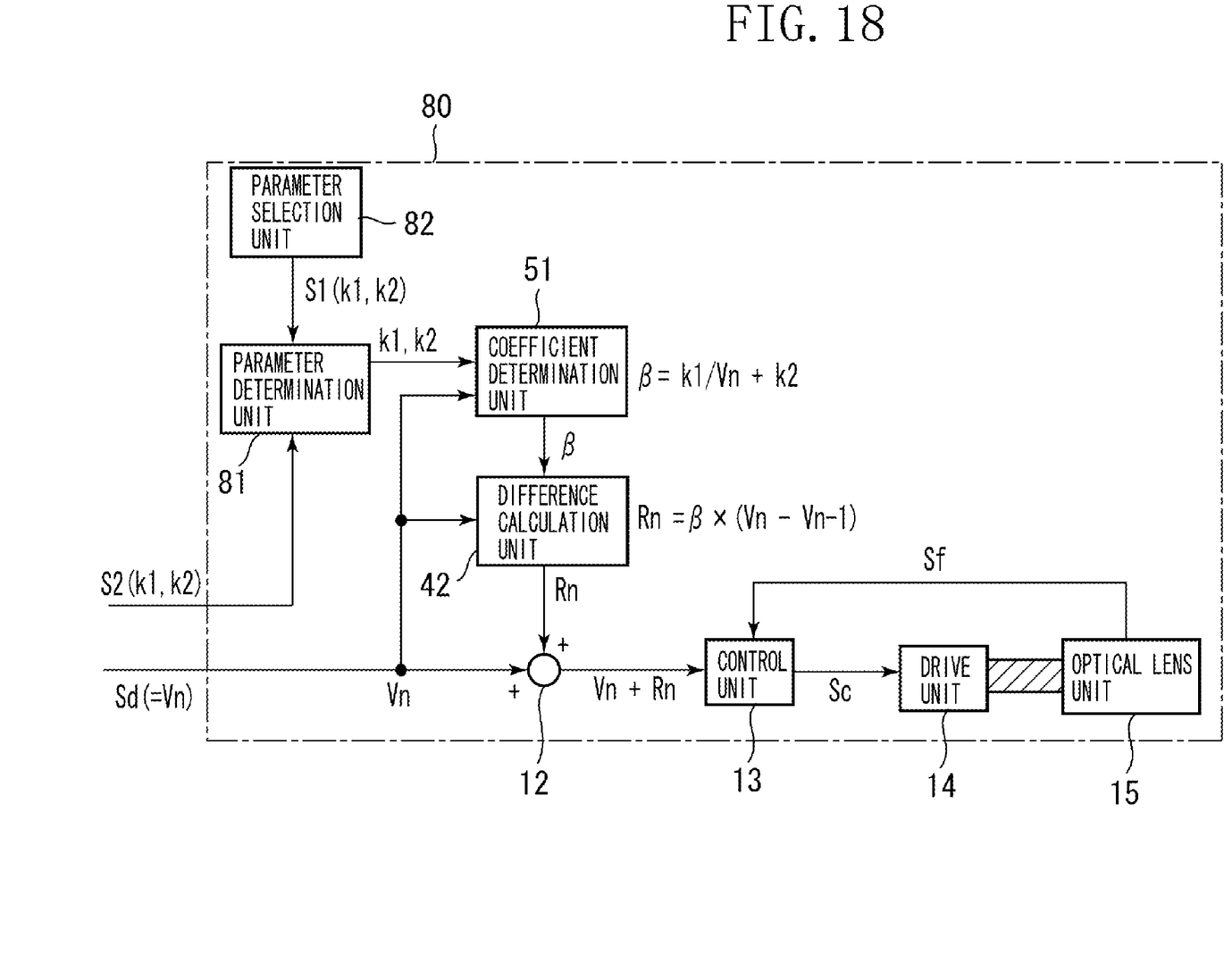
FIG. 18 is a functional block diagram illustrating a lens apparatus according to the fourth exemplary embodiment of the present invention.

FIG. 18 is a functional block diagram illustrating the lens apparatus 80 according to the fourth exemplary embodiment of the present invention.

The lens apparatus 80 differs from the lens apparatus 50 according to the third exemplary embodiment in that the parameter determination unit 52 is replaced with a parameter determination unit 81, and a parameter selection unit 82 is added. The parameter selection unit 82 selects the values of the parameters k1 and k2, and mainly includes a variable resistance placed on the lens apparatus 80. Also, the parameter selection unit 82 outputs to the parameter determination unit 81 a selection result signal S representing the values of the parameters k1 and k2.

The parameter determination unit 81 preferentially outputs the parameters k1 and k2, which are represented by the inherent characteristic signal S2, to the coefficient determination unit 51 based on the input selection result signal S1 output from the parameter selection unit 82 and the input inherent characteristic signal S2 output from the controller 70.

In a case where the selection result signal S1 output from the parameter selection unit 82 is changed, the parameters k1 and k2 represented by the selection result signal S1 are output to the coefficient determination unit 51. Incidentally, the priority of the parameters is not limited to the above priority of the parameters represented by the inherent characteristic signal S2. One of the selection result signal S1 and the inherent characteristic signal S2 can be selected to have a priority.

Thus, with the lens system 80 according to the fourth exemplary embodiment of the present invention, the values of the parameters k1 and k2, which reflect inherent operation characteristics, can be set in the controller 70.

Also, an operator can set optimal parameters while watching an actual zooming operation.

The thumb ring 31 returns to the central position O at high speed in cases where the spring constant "a" of the controller 70 is large, or where the dynamic/static friction coefficients and the damping factors of the damping elements of the thumb ring 31 are low. Consequently, the thumb ring 31 may pass over the central position O. At that time, the controller 70 may output unintended signals having opposite polarity. Also, the command signal Sd may extremely drastically change in cases where the cutoff frequency of the filter unit 71d is high, or where the gradient (=V/X) of the demand curve is very large.

In such cases, a command signal whose frequency exceeds a frequency corresponding to the limit to the responsibility of a lens control system is input to the control unit. Consequently, unfavorable operations, such as an overshoot caused at the time of stopping of the movable portion, may occur. Conversely, in a case where the thumb ring 31 gradually returns to the central position O, for example, in a case where the spring constant "a" is low, or where the dynamic/static friction coefficients and the damping factors of the damping elements of the thumb ring 31 are large, the rate of deceleration of the zoom lens portion is low, and a phenomenon in which braking does not work when the zoom lens portion stops may occur.

In view of these problems, on the condition on which an overshoot easily occurs during deceleration, as in the former cases, it is useful to set the parameters k1 and k2 to small values. Also, in the latter cases, to increase the rate of change of the command signal Sd, it is useful to set the parameters k1 and k2 to large values.

Additionally, on the condition that a drastic operation is similarly prevented even during acceleration, for example, in a case where the spring constant "a" of the controller 70 is large, or where the dynamic/static friction coefficients and the damping factors of the damping elements of the thumb ring 31 are large, it is useful to increase the rate of change of the command signal Sd. Consequently, it is useful to set the parameters k1 and k2 to large values.

Also, to take into consideration an operator's habit at the time of operating the thumb ring 31, the lens system is configured so that an actual command signal Sd from the thumb ring 31 is taken into the inherent characteristic calculation unit 71c, and that the parameters k1 and k2 are automatically determined. Thus, an operation for setting the parameters k1 and k2 can be omitted. For example, in a case where the speed at which the thumb ring 31 is rotated varies with the operative positions, the difference in the speed can be taken into consideration. Also, to bring an operation of the zoom lens portion close to the intention of an operator, it is useful to impart a function of learning the operator's habit to the lens system.

Also, driving capability of the drive unit, drive torque of the movable portion, conditions of a power supply, which relate to a power supply voltage and electric current, and various characteristics and features of the lens apparatus can be taken into consideration for setting the parameters k1 and k2, similar to the above cases.

The lens system, whose functions are distributed to the controller 70 and the lens apparatus 80, has been described in the fourth exemplary embodiment of the present invention. However, the system according to the present embodiment is not limited thereto.

Particularly, signal processing units can collectively be placed in one of the controller 70 and the lens apparatus 80. It is sufficient to configure the system to have similar functions as a whole.

In the above exemplary embodiments, the coefficient to be multiplied by the result of computing the difference between the values of the command signals Vn is changed according to predetermined conditions. For example, according to the third exemplary embodiment of the present invention, the coefficient is set to a small value during deceleration, as compared with the coefficient set during acceleration. The coefficient can similarly be set to a small value by setting an upper limit value to the result of computing the difference. That is, it is useful to configure the lens system so that the difference calculation result Rn to be added to the value of the command signal Sd can be changed according to predetermined conditions.

Fifth Exemplary Embodiment

Figure 19:
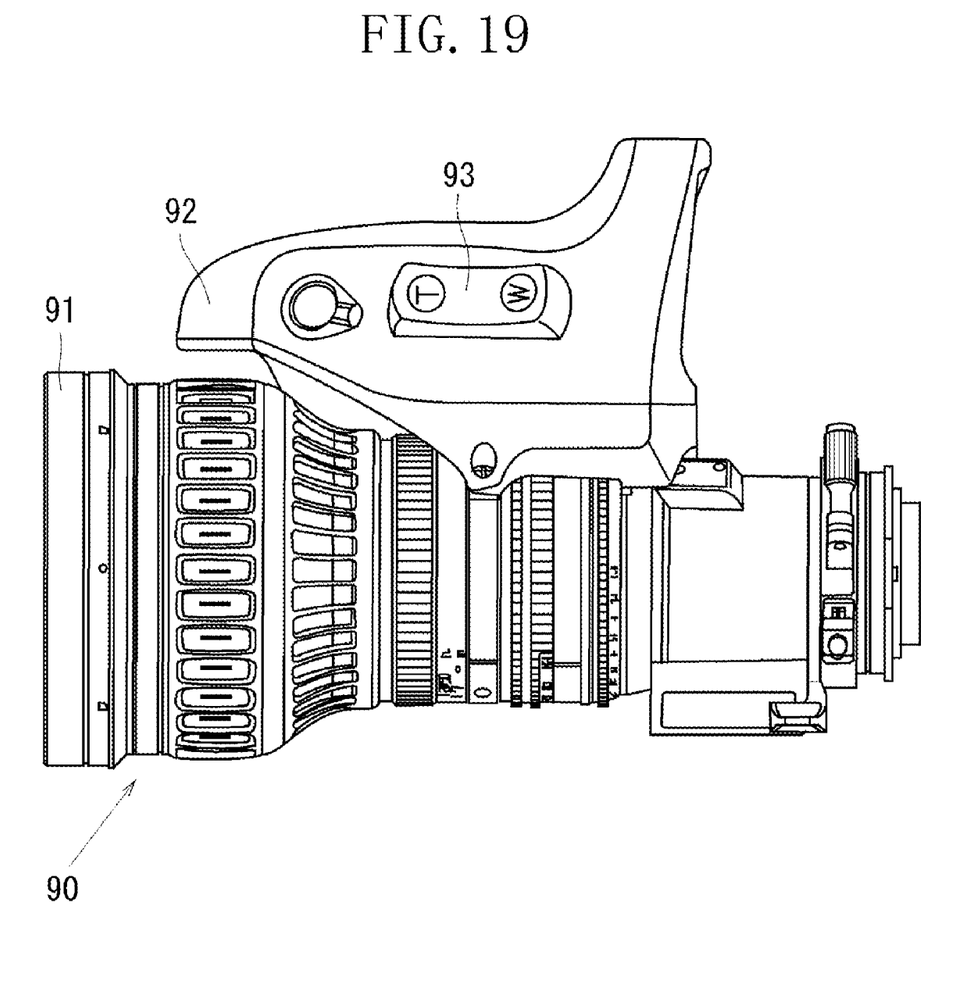
FIG. 19 is a diagram illustrating a lens system according to a fifth exemplary embodiment of the present invention.

FIG. 19 is a diagram illustrating a lens system 90 according to a fifth exemplary embodiment of the present invention. The lens system 90 includes a lens apparatus generally referred to as a handy lens, which is configured integrally with a controller. The lens system 90 includes an optical lens unit 91 and a drive unit 92.

The optical lens unit 91 is a lens apparatus provided in the lens system 90. The drive unit 92 contains a control unit and a drive unit. A zooming speed can be controlled by pushing a seesaw potentiometer 93.

In each of the controllers described in the above exemplary embodiments, the command signal output from the controller is a speed signal used to control the speed of an object. However, the command signal can be a position signal used to control the position of an object.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-125487 filed Apr. 28, 2006, which is hereby incorporated by reference herein in its entirety.

What is claimed is:

1. A lens apparatus comprising:
an optical lens unit including a movable lens portion;
a drive unit configured to drive the movable lens portion;
a control unit configured to control the drive unit;
a difference calculation unit configured to calculate a difference between command signals received adjoining each other in time sequence; and
an addition unit configured to add the difference calculated by the difference calculation unit to each of the command signals,
wherein the control unit controls the drive unit based on a result of an addition performed by the addition unit.

2. The lens apparatus according to claim 1, further comprising a coefficient determination unit configured to determine a coefficient to be multiplied by the calculated difference to change an output of the difference calculation unit.

3. The lens apparatus according to claim 2, wherein the coefficient is a constant.

4. The lens apparatus according to claim 2, wherein the coefficient is a function of the command signal.

5. The lens apparatus according to claim 2, wherein the coefficient is a function for a difference between the command signals.

6. The lens apparatus according to claim 5, wherein the coefficient determination unit sets the coefficient to different values between when the difference decreases and when the difference increases.

7. The lens apparatus according to claim 5, wherein the coefficient determination unit sets the coefficient to a smaller value when the difference decreases than when the difference increases.

8. The lens apparatus according to claim 5, wherein the coefficient determination unit sets the coefficient to a value of 0 one of when the difference has a value of 0 or when the command signals differ in sign from each other.

9. A lens system comprising:
an optical lens unit including a movable lens portion;
a controller configured to output a command signal to the optical lens unit;
a drive unit configured to drive the movable lens portion;
a control unit configured to control the drive unit;
a difference calculation unit configured to calculate a difference between command signals received from the controller adjoining each other in time sequence; and
an addition unit configured to add the difference calculated by the difference calculation unit to each of the command signals,
wherein the control unit controls the drive unit based on a result of an addition performed by the addition unit.

10. The lens system according to claim 9, further comprising a coefficient determination unit configured to determine a coefficient to be multiplied by the calculated difference to change an output of the difference calculation unit.

* * * * *